(12) United States Patent
Lee

(10) Patent No.: US 9,538,275 B2
(45) Date of Patent: Jan. 3, 2017

(54) HANDS-FREE APPARATUS

(71) Applicant: Youngok Lee, Gainesville, FL (US)

(72) Inventor: Youngok Lee, Gainesville, FL (US)

(73) Assignee: Youngok Lee, Gainesville, FL (US)

( * ) Notice: Subject to any disclaimer, the term of this patent is extended or adjusted under 35 U.S.C. 154(b) by 1056 days.

(21) Appl. No.: 13/662,502

(22) Filed: Oct. 28, 2012

(65) Prior Publication Data

US 2013/0108069 A1    May 2, 2013

Related U.S. Application Data

(60) Provisional application No. 61/552,441, filed on Oct. 27, 2011.

(51) Int. Cl.
*H04R 25/00* (2006.01)
*H04R 1/10* (2006.01)

(52) U.S. Cl.
CPC ......... *H04R 1/1033* (2013.01); *H04R 2499/11* (2013.01)

(58) Field of Classification Search
USPC ......................................... 381/370, 374, 379
See application file for complete search history.

(56) References Cited

U.S. PATENT DOCUMENTS

| | | | | |
|---|---|---|---|---|
| 7,680,267 B2 * | 3/2010 | Bradford | .............. | H04R 1/1058 379/430 |
| 8,204,549 B2 * | 6/2012 | Kim | .................... | H04M 1/0258 381/370 |

* cited by examiner

*Primary Examiner* — Amir Etesam
(74) *Attorney, Agent, or Firm* — I P & T Group LLP

(57) ABSTRACT

A hands-free apparatus includes a hands-free apparatus main body having a holding recess part and integrated and separable port parts, and an earphone that is electrically connected with the integrated port part with being inserted into the holding recess part in a first state and is configured to be able to adjust a length of wiring relative to the hands-free apparatus main body in electrical connection with the separable port part in a second state.

17 Claims, 12 Drawing Sheets

HANDS-FREE APPARATUS

CROSS-REFERENCE TO RELATED APPLICATIONS

This application claims priority of a provisional application No. of 61/552,441 filed on Oct. 27, 2011. The disclosure of each of the foregoing applications is incorporated herein by reference in its entirety.

BACKGROUND OF THE INVENTION

Field of the Invention

The present invention relates to a hands-free apparatus, and more particularly, to a hands-free apparatus that is connected with an electronic instrument such as a mobile phone or an MPEG-1 or MPEG-2 Audio Layer III (MP3) player by wire and/or wireless so as to enable communication or listening to music without directly operating the electronic instrument by hand.

Description of the Related Art

Hands-free apparatuses are apparatuses that allow functions of electronic instruments such as mobile phones or MP3 players to be controlled by wire or wireless, and have been developed and used to improve convenience by reducing use of the hand during using the electronic instruments. It was formerly common to connect the hands-free apparatus to the electronic instruments such as mobile phones by wire. Recently, with the development of short-distance wireless communication technologies such as Bluetooth that connect the electronic instruments such as mobile phones, computers, printers, facsimile, televisions (TVs), and refrigerators, many wireless hands-free apparatuses have been developed and used. In detail, hands-free apparatuses for short-distance wireless communications such as Bluetooth ear-set/headset providing the convenience of wireless because the short-distance wireless communication technologies such as Bluetooth are mounted in the electronic instruments such as mobile phones have been made popular. In addition to Bluetooth, various technologies such as Wi-Fi, Zigbee, Ultra WideBand (UWB), binary code-division multiple access (CDMA), Wibree, etc. have been successively developed, and thus the hands-free apparatuses have been further diversified.

The hands-free apparatuses can be divided into a stereo type in which two earphones are inserted into both ears for the purpose of mainly listening audio such as music or a foreign language, and a mono type in which one earphone is inserted into one ear alone for the purpose of mainly talking on the telephone. Further, the hands-free apparatuses can be divided into a separable type in which an earphone(s) can be separated from the hands-free apparatus, and an integrated type in which an earphone is mounted in the hands-free apparatus.

The separable type hands-free apparatuses are mostly configured to wear or attach a hands-free apparatus main body around the neck or to clothes to connect the earphone(s) to the hands-free apparatus main body by wire when used. The separable type hands-free apparatuses using the short-distance wireless communication actually provide convenience only to large appliances such as TV. In view of the fact that the basic object of the separable type hands-free apparatuses is to apply wireless technology to provide the convenience of wear and use, the separable type hands-free apparatuses provide the convenience of wear and use in that they are worn around the neck when in use thanks to slightly lighter weight than the compact portable instruments such as mobile phones or MP players. However, the separable type hands-free apparatuses do not particularly provide the convenience of wireless, because a cord should be used to be worn around the neck, and because wiring should be provided to connect the hands-free apparatus main body and the earphone(s).

In addition to this, among the hands-free apparatuses for the wireless communication technologies such as Bluetooth, the integrated type in which a hands-free apparatus main body and an earphone(s) are integrated and the earphone portion is directly inserted and used has been much used of late. The apparatuses of this type can be reliably fixed to the ear, and are worn around the neck using a cord or are separately stored when not in use. However, since the integrated type is used in such a manner that the hands-free apparatus itself is directly inserted into the ear, the integrated type is inconvenient when worn for a long time, and is difficult to fix to the ear in the case of violent activities.

In this way, the existing hands-free apparatuses are configured to be able to use only one of the integrated type that is inserted into the ear when in use and the separable type that is worn around the neck and is connected with the earphone by wiring. Thus, these hands-free apparatuses are restricted by the fact that one hands-free apparatus cannot selectively use several types so as to be suitable for circumstances.

SUMMARY OF THE INVENTION

Accordingly, the present invention has been made in an effort to solve the problems occurring in the related art, and an object of the present invention is to provide a hands-free apparatus capable of simultaneously realizing a separable type in which a hands-free apparatus main body and an earphone can be separated from each other and an integrated type in which the hands-free apparatus main body and the earphone are integrated.

Also, the present invention has been made in an effort to solve the problems occurring in the related art, and an object of the present invention is to provide a hands-free apparatus, in which, in a separable structure in which an earphone is separated from a hands-free apparatus main body having a communication function, an automatic take-up unit is allowed to automatically draw wiring from or into a main body of the earphone so as to allow a length of the wiring to be adjusted relative to the hands-free apparatus main body.

Furthermore, the present invention has been made in an effort to solve the problems occurring in the related art, and an object of the present invention is to provide a hands-free apparatus having a function as an accessory, capable of selectively harmonizing with a human body or a dress.

Also, the present invention has been made in an effort to solve the problems occurring in the related art, and an object of the present invention is to provide a hands-free apparatus having improved utility, capable of improving the activity and convenience of a user.

According to the hand-free apparatus of the present invention, a separable type in which a hands-free apparatus main body and an earphone are separated from each other and an integrated type in which the hands-free apparatus main body and the earphone are integrated can be simultaneously realized. Thereby, a user can selectively change the use to maximize convenience.

According to the hand-free apparatus of the present invention, a length of the earphone can be adjusted as needed, so that the hands-free apparatus can be worn at various positions. The hands-free apparatus is easily carried to promote convenience, thereby maximizing merchantability.

According to the hand-free apparatus of the present invention, a variety of decorating means are selectively mounted on the hands-free apparatus main body and the earphone in a replaceable way. Thereby, one hands-free apparatus provides its original function as well as a function as one of various fashion accessories, so that it can selectively harmonize with a human body or a dress.

According to the improved hand-free apparatus of the present invention, a variety of fastening means are allowed to be selectively replaced and worn at one of various positions of a human body or clothes. Thereby, the inconvenience that the hands-free apparatus main body should be worn around the neck or be separately carried when not in use is removed, so that the activity and convenience of the user can be improved.

As described above, according to the hand-free apparatus of the present invention, a separable type in which a hands-free apparatus main body and an earphone are separated from each other and an integrated type in which the hands-free apparatus main body and the earphone are integrated can be simultaneously realized. Thereby, a user can selectively change the use to maximize convenience.

As described above, according to the hand-free apparatus according of the present invention, a length of the earphone can be adjusted as needed, so that the hands-free apparatus can be worn at various positions. The hands-free apparatus is easily carried to promote convenience, thereby maximizing merchantability.

As described above, according to the hand-free apparatus whose usability is improved, a variety of decorating means are selectively mounted on the hands-free apparatus main body and the earphone in a replaceable way. Thereby, one hands-free apparatus provides its original function as well as a function as one of various fashion accessories, so that it can selectively harmonize with a human body or a dress.

As described above, in the hand-free apparatus having improved utility according to the present invention, a variety of fastening means are allowed to be selectively replaced and worn at one of various positions of a human body or clothes. Thereby, the inconvenience that the hands-free apparatus main body should be worn around the neck or be separately carried when not in use is removed, so that the activity and convenience of the user can be improved.

DETAILED DESCRIPTION OF PREFERRED EMBODIMENTS

Reference will now be made in greater detail to a configuration of the present invention with reference to the accompanying drawings.

DETAILED DESCRIPTION OF PREFERRED EMBODIMENTS

Figure 1:
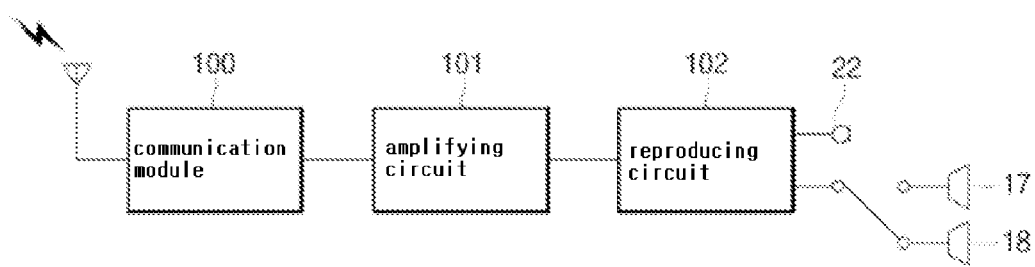
FIG. 1 is a circuit diagram showing an internal circuit of a hands-free apparatus according to the present invention.

Reference will now be made in greater detail to a configuration of the present invention with reference to the accompanying drawings. In drawings, the same components are denoted by the same reference numerals, and a detailed description thereof will be omitted.

Figure 2:
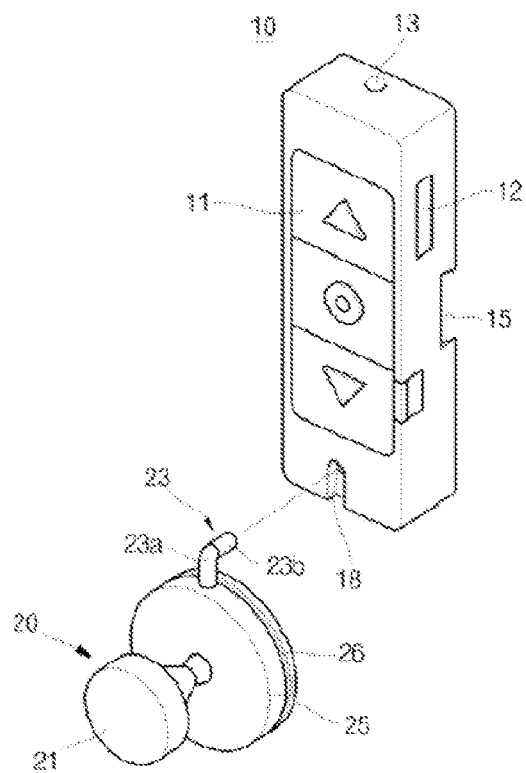
FIGS. 2 and 3 are perspective views showing the hands-free apparatus according to the present invention.
Figure 3:
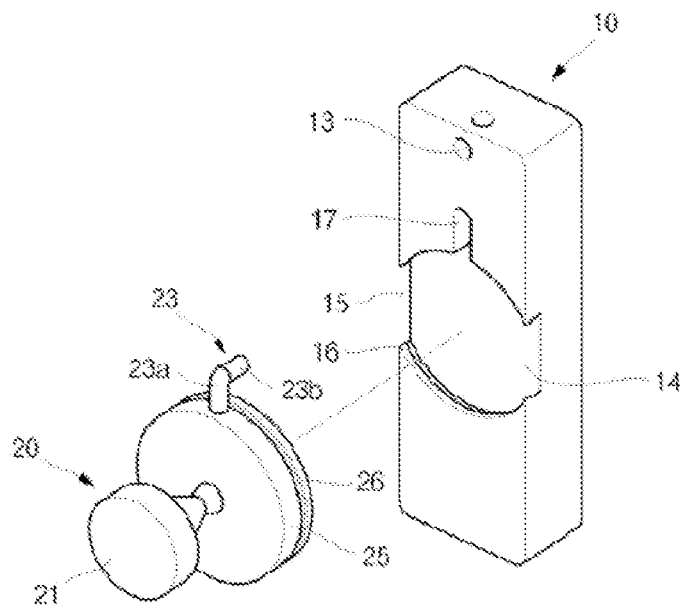

FIG. 1 is a circuit diagram showing an internal circuit of a hands-free apparatus according to the present invention, and FIGS. 2 and 3 are perspective views showing the hands-free apparatus according to the present invention.

The hands-free apparatus of the present invention includes a hands-free apparatus main body 10 in which a communication module 100, an amplifying circuit 101, and a reproducing circuit 102 are mounted, and an earphone 20 that is mounted/demounted on the hands-free apparatus main body 10 and reproduces an audio signal received through the communication module.

As shown in FIG. 1, the communication module 100 receiving an audio signal transmitted from an instrument such as an MPEG-1 or MPEG-2 Audio Layer III (MP3) player or a mobile phone by wire or wireless, the amplifying circuit 101 amplifying the received audio signal, and the reproducing circuit 102 reproducing the amplified signal into a predetermined electric signal representing a sound wave are mounted in the hands-free apparatus main body 10.

As shown in FIG. 2, a button set 11 including a power/communication button, a volume-up button, and a volume-down button is provided in the front of the hands-free apparatus main body 10. The button set 11 is configured so that each button can be separated to be inserted into a button port of the hands-free apparatus main body 10 and has enough size to operate with a finger without a sight. This button set 11 may be made of buttons commonly used as input means such as a touch type, a voice recognition module type, or the like. Here, the buttons are not limited to their type, number, and structure by the present invention.

Further, the hands-free apparatus main body 10 is provided with a charge port 12 on one side thereof which is used to charge the hands-free apparatus in a universal serial bus (USB) interface mode, and a loop hole 13 into which a cord is inserted for carrying or storage so as to be able to be connected to a mobile phone or a bag or to be worn around the neck.

The earphone 20 has a speaker (not shown) mounted therein to amplify and output the audio signal received through the communication module 100. The earphone 20 is provided with an inserting part 21 at an end thereof which encloses the speaker and protrudes to be inserted into the ear of a user. When inserted into the ear of the user, the inserting part 21 is softly deformed so as to allow an inserted state to be firmly maintained. Thus, no holding means for holding the earphone 20 on the ear in a shape similar to an auricle is apparently required. Further, a microphone 22 receiving voice of the user is provided at a portion nearest a mouth of the user.

Further, the earphone 20 is provided with a connection plug 23, which includes a support part 23a and a rotating part and is connected with either port parts 17 and 18 of the hands-free apparatus main body 10 in order to amplify the audio signal of the hands-free apparatus main body 10 to output it to the speaker mounted in the earphone 20. The connection plug 23 is provided with wiring 24 having a predetermined length at an end thereof (see FIG. 5) so as to be able to maintain an adequate distance from the hands-free apparatus main body 10. Here, an automatic take-up unit (not shown) that pulls the wiring 24 inward a main body of the earphone 20 so as to be automatically wound, and a stop unit (not shown) that controls tensile force caused by the automatic take-up unit are provided.

The hands-free apparatus configured in this way in accordance with the present invention can simultaneously realize the integrated type in which the hands-free apparatus main body 10 and the earphone 20 are integrated and the separable type in that the hands-free apparatus main body 10 and the earphone 20 are separated from each other, and thus maximize convenience.

Figure 4:
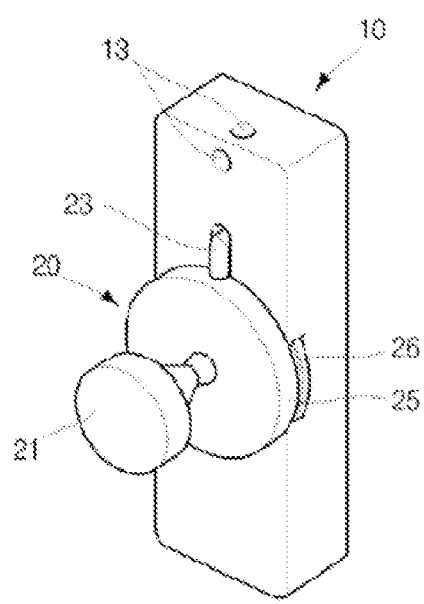
FIG. 4 is a coupled perspective view showing one embodiment of a state in which the earphone is mounted on the hands-free apparatus main body in accordance with the present invention.

FIG. 4 is a coupled perspective view showing one embodiment of a state in which the earphone is mounted on the hands-free apparatus main body in accordance with the present invention. One embodiment according to the present invention is a structure in which the earphone 20 is held to the hands-free apparatus main body 10, and is adapted to be able to realize a new integrated structure.

As shown in FIGS. 3 and 4, the hands-free apparatus main body 10 is provided with a holding recess part 14, in which the earphone 20 is mounted, in the rear thereof. The holding recess part 14 has the shape of a concave recess part which is identical to a shape of the earphone 20, and more particularly a shape of a cover part 25 formed on the opposite side of the inserting part 21 of the earphone 20. The holding recess part 14 is formed so that the cover part 25 of the earphone 20 can be housed therein, and is provided with a fixing part at a position corresponding to that of the cover part 25 of the earphone 20 so that the cover part 25 of the earphone 20 can be firmly fixed without coming out in an inserted state. In the exemplary embodiment according to the present invention, the fixing parts are a first element formed in the hands-free apparatus main body 10 and a second element generating a coupling force in interaction with the first element. In detail, a ridge part 16 is formed on a defined surface of the holding recess part 14 formed in the hands-free apparatus main body 10 in a lengthwise direction of the defined surface, and a groove part 26 is formed in the cover part 25 of the earphone which is housed in the holding recess part 14 so as to correspond to the ridge part 16. Here, the fixing parts are not limited to this configuration by the present invention. As long as the holding recess part 14 of the hands-free apparatus main body 10 and/or the cover part 25 of the earphone 20 have a structure in which they are not easily decoupled after being coupled, any structure may be used. Here, as shown in the accompanying figures, the holding recess part 14 is configured so that a diameter thereof is longer than a width between opposite sides of the hands-free apparatus main body 10, and thus the opposite sides are open in part. Accordingly, the open parts of the opposite sides of the hands-free apparatus main body 10 are formed as openings 15. The openings 15 are used to easily decouple the earphone 20, which is inserted and coupled into the holding recess part 14 of the hands-free apparatus main body 10, from the hands-free apparatus main body 10. This decoupling is easily done in such a manner that a user pulls one side of the cover part 25 of the earphone 20 which is exposed outside each opening by hand.

Further, the integrated port part 17 to which the connection plug 23 of the earphone 20 can be connected is provided at a position adjacent to one side of the holding recess part 14 in communication with the holding recess part 14. Here, an interval between a lower end of the holding recess part 14 and an upper end of the integrated port part 17 is adapted to be identical to an interval between an upper end of the connection plug 23 of the earphone 20 and a lower end of the cover part 25 corresponding to this. For this reason, the earphone 20 is preferably configured so that the wiring 24 wound in the main body thereof by the automatic take-up unit does not easily come out.

Thus, as shown in FIG. 4, the cover part 25 of the earphone 20 is inserted into the holding recess part 14 formed in the rear of the hands-free apparatus main body 10, and simultaneously the connection plug 23 of the earphone 20 is also inserted into the integrated port part 17. Thereby, the earphone 20 is mounted in the hands-free apparatus main body 10 so as to be able to fulfill the same function as the integrated structure.

Figure 5:
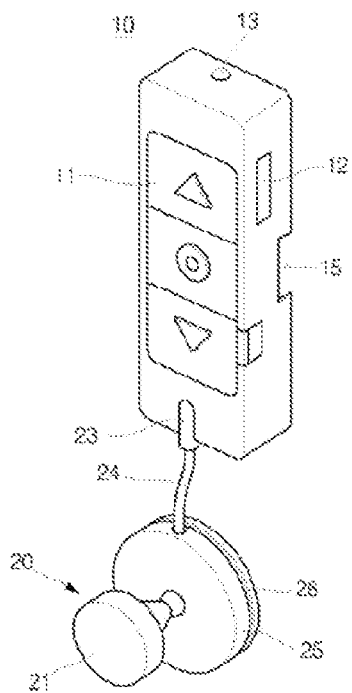
FIG. 5 is a coupled perspective view showing another embodiment of the state in which the earphone is mounted on the hands-free apparatus main body in accordance with the present invention.

FIG. 5 is a coupled perspective view showing another embodiment of the state in which the earphone is mounted on the hands-free apparatus main body in accordance with the present invention. Another embodiment according to the present invention is a structure in which the wiring 24 connected to the end of the connection plug 23 of the earphone 20 can be pulled out and used with the earphone 20 connected to the hands-free apparatus main body 10, and is adapted to be able to realize a new separable structure.

As shown in FIGS. 2 and 5, the hands-free apparatus main body 10 has a separable port part 18, into which the connection plug 23 of the earphone 20 is inserted, in at least one of the front or rear, an upper or lower surface, and opposite sides thereof. In the exemplary embodiment of the present invention, the separable port part 18 is formed in the front of the hands-free apparatus main body 10. Here, the main body of the earphone 20 is installed so as to extend outwardly from the hands-free apparatus main body 10. This is intended to pull the earphone 20 to unwind the wiring 24 in the main body of the earphone by a desired length in a state in which the hands-free apparatus main body 10 is worn at one of various positions of a human body or clothes, thereby allowing the inserting part 21 of the earphone 20 to be inserted into the ear of a user. Preferably, the earphone 20 does not interfere with the hands-free apparatus main body 10 in a direction in which the earphone 20 is pulled. Thus, the separable port part 18 may be provided at the upper or lower end of the hands-free apparatus main body 10. Here, the separable port part 18 is not limited to its installation position by the present invention.

Figure 6:
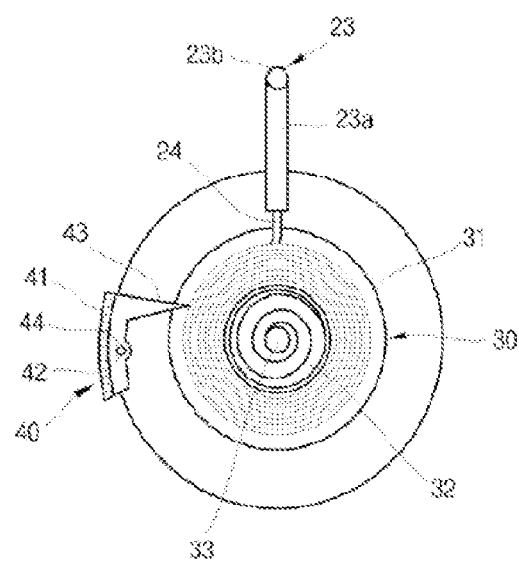
FIG. 6 shows an automatic take-up unit of the hands-free apparatus according to the present invention.

FIG. 6 shows an automatic take-up unit of the hands-free apparatus according to the present invention.

As shown in FIG. 6, the automatic take-up unit 30 can be provided with a first elastic member 32, i.e. a spiral elastic spring wound in a spiral shape, in the center of a drum 31. One end of the elastic spring is fixed to a fixing shaft 33 in the center of the drum 31, and the other end is fixed to an end of the wiring 24. Thus, the first elastic member 32 causes the wiring 24 to be wound in the drum 31 located in the earphone 20 by a restoring force that always tends to be restored to its original state, thereby functioning to hold and store the wiring in the main body of the earphone 20.

Further, the stop unit 40 includes an operational knob 41, which is rotatably fixed to a hinge shaft 42, on one side of the cover part 25 of the earphone 20, and more preferably on one side of the cover part 25 exposed through one opening 15 of the hands-free apparatus main body 10 when the earphone 20 is integrally coupled to the hands-free apparatus main body 10 of the hands-free apparatus, which will be described below. The operational knob 41 is provided with a protrusion piece 43 on one side thereof which protrudes to the inside of the main body of the earphone 20 and selectively restricts the wiring 24. Further, a second elastic member 44, i.e. a torsion spring, causing the protrusion piece 43 to maintain an elastic force with respect to the wiring is mounted on the hinge shaft 42 of the operation knob 41. Thus, when the operation knob 41 of the stop unit 40 exposed outside the earphone 20 is pushed, the protrusion piece 43 restricting the wiring 24 rotates about the hinge shaft 42 against the elastic force of the torsion spring that is the second elastic member 44, thereby releasing the wiring from the restriction. In contrast, when the operational knob 41 is not pushed, the protrusion piece 43 is restored centered on the hinge shaft 42 by the restoring force of the torsion spring, thereby restricting the wiring 24 again. That is, a user can pull out the earphone 20 by a desired length in a state in which he/she pushes the operation knob 41 of the stop unit 40. When the user does not push the operation knob 41 of the stop unit 40, the wiring 24 is stopped in a state in which it is unwound from the automatic take-up unit by the pulled length.

Figure 7:
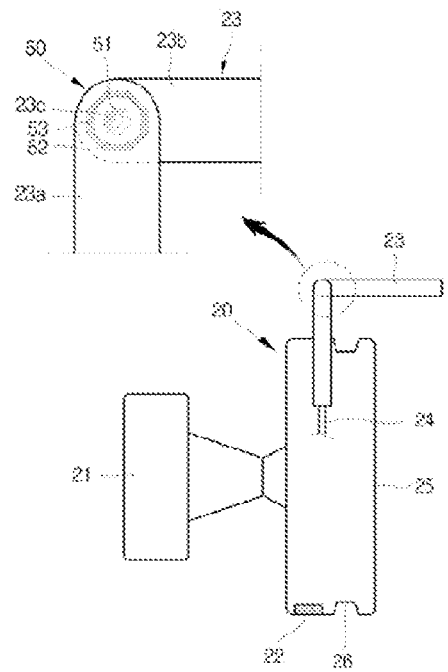
FIG. 7 shows a rotating unit of the connection plug of the hands-free apparatus according to the present invention.
Figure 8:
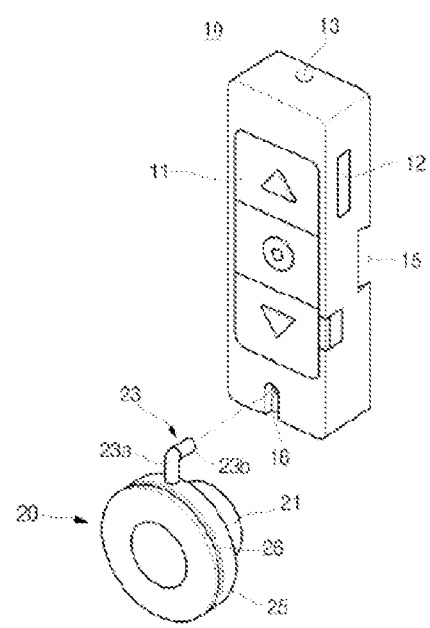
FIG. 8 is a perspective view showing a state before a front part of the hands-free apparatus according to the present invention and a front part of the cover part of the earphone are coupled in parallel.

FIG. 7 shows a rotating unit of the connection plug of the hands-free apparatus according to the present invention, and FIG. 8 is a perspective view showing a state before a front part of the hands-free apparatus according to the present invention and a front part of the cover part of the earphone are coupled in parallel.

When the connection plug 23 of the earphone 20 is inserted into and electrically connected to the separable port part 18 formed in the front of the hands-free apparatus main body 10, as shown in FIGS. 2 and 6, the inserting part 21 of the earphone 20 protrudes toward the front of the hands-free apparatus main body 10, and thus there is a problem that an aesthetic design is reduced. Thus, the cover part 25 of the earphone 20 is located so as to be able to be exposed to the front of the hands-free apparatus main body 10, so that an aesthetic effect of the hands-free apparatus can be expected. That is, the connection plug 23 of the earphone 20 which is connected to the separable port part 18 formed in the front of the hands-free apparatus main body 10 can be rotated at an angle of 180° due to its own rotating structure, so that the front of the hands-free apparatus main body 10 and the front of the cover part 25 of the earphone 20 can be located in parallel. Here, when the connection plug 23 is rotated and mounted to the angle of 180° after being detached from the main body of the earphone 20, the same mounting structure can be obtained, but the wiring 24 housed in the earphone 20 may be entangled. Accordingly, in the present invention, instead of excluding this mounting structure, another embodiment according to the present invention will be applied through the following configuration.

To this end, in the exemplary embodiment according to the present invention, the connection plug 23 is made up of a support part 23a supported on the main body of the earphone 20 and a rotating part 23b that is pivotable around a rotating shaft 23c relative to the support part 23a. Thus, the rotating part 23b of the connection plug 23 can be rotated around the rotating shaft 23c at angle of 180°. Here, the connection plug 23 may have only the rotating structure as described above. Furthermore, the connection plug 23 may give stepwise motion to the rotating structure. To this end, a rotating unit 50 is installed on the rotating shaft 23c so as to allow the rotating part 23b to be gradually rotated while the rotating part 23b maintains a stopped state with respect to the support part 23a at a plurality of positions.

The rotating unit 50 includes a stopper 51, an elastic member 52, and a hinge guide 53. The stopper 51 is formed on a circumferential surface of the rotating shaft 23c installed on an end of the support part 23a of the connection plug 23, thereby maintaining the position of the rotating part 23b in a stopped state. A leaf spring that is the elastic member 52 is placed on an inner wall of the stopper 51, and applies an elastic force to the rotating part 23b of the connection plug 23. Further, the hinge guide 53 has a polygonal shape in which a plane enclosed with at least three straight lines at the end of the rotating part 23b of the connection plug 23 is included, thereby setting a rotating position to the stopper 51 and rotating about the rotating shaft 23c of the support part 23a along with the rotating part 23b.

In the rotating unit 50 as described above, the rotating part 23b of the connection plug 23 can be rotated left and right at an angle of 180°. That is, when the rotating part 23b is rotated, the hinge guide 53 is rotated together. A rotating angle of the rotating part is controlled by the elastic member 52 that is fixed to the support part 23a and applies an elastic force to the hinge guide 53. That is, since the hinge guide 53 has the polygonal shape, the elastic member 52 rotates the rotating part 23b at an angle capable of corresponding to one side of the hinge guide. Thus, as shown in FIG. 8, when the connection plug 23 of the earphone 20 is electrically connected to the separable port part 18, the rotating part 23b of the connection plug 23 is rotated at an angle of 180° so that the cover part 25 of the earphone 20 can be located in front of the hands-free apparatus main body 10, the aesthetic effect can be improved due to beautiful appearance, and the merchantability can be further improved.

Figure 9:
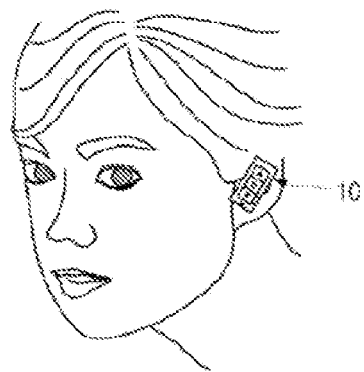
FIG. 9 shows one embodiment of the state of use of the hands-free apparatus according to the present invention.
Figure 10:
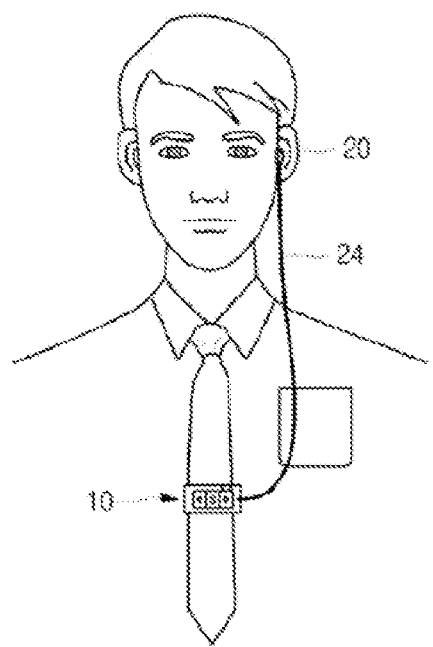
FIG. 10 shows another embodiment of the state of use of the hands-free apparatus according to the present invention.

Accordingly, the present invention is configured so that, as shown in FIG. 9, when the earphone 20 is mounted on the hands-free apparatus main body 10, the entire main body of the earphone 20 is integrally mounted so that the connection plug 23 is inserted into the integrated port part 17 and only the inserting part 21 can be inserted into the ear of the user, and thus the hands-free apparatus main body 10 and the earphone 20 can be used in an integrated fashion, and so that, as shown in FIG. 10, the connection plug 23 of the earphone 20 is inserted into the separable port part 18, and the inserting part 21 located at a position corresponding to the connection plug 23 easily extends via the wiring 24 housed in the earphone 20 so as to be able to be inserted into the ear of the user, and thus the hands-free apparatus main body 10 and the earphone 20 can be used in a separable fashion.

Figure 11:
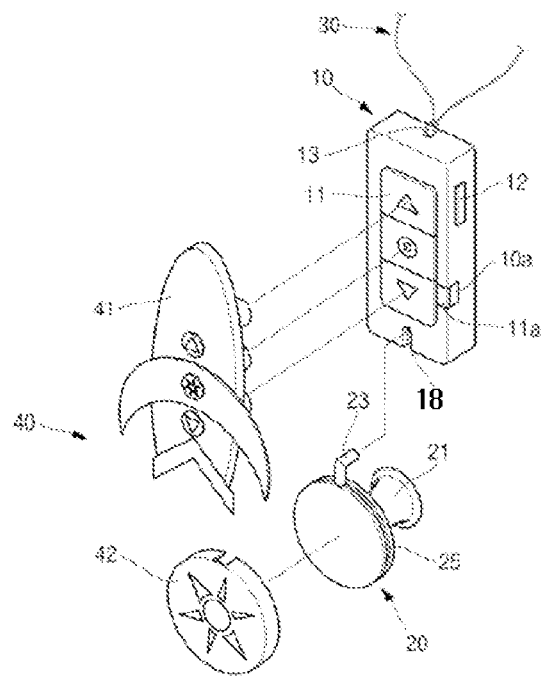
FIG. 11 is an exploded perspective view showing a coupling structure of a hands-free apparatus according to one embodiment of the present invention.
Figure 12:
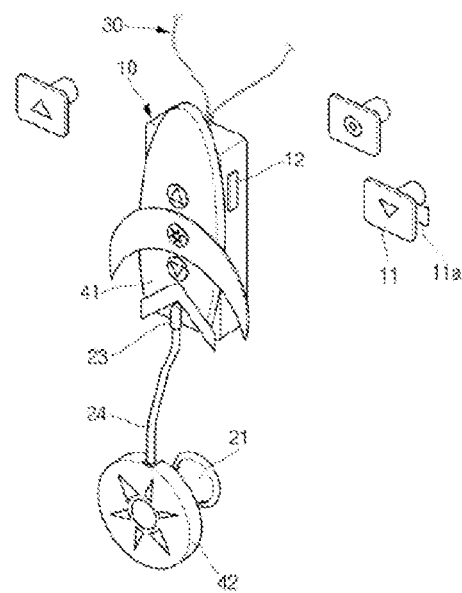
FIG. 12 is a perspective view showing a coupled state of FIG. 1.

FIG. 11 is an exploded perspective view showing a coupling structure of a hands-free apparatus according to one embodiment of the present invention, and FIG. 12 is a perspective view showing a coupled state of FIG. 11.

As shown in FIG. 11, the hands-free apparatus according to one embodiment of the present invention includes a hands-free apparatus main body 10, an earphone 20, fastening means 30, and decorating means 40.

Here, a communication module (not shown) receiving an audio signal transmitted from an electronic instrument such as an MPEG-1 or MPEG-2 Audio Layer III (MP3) player or a mobile phone by wire or wireless, an amplifying circuit (not shown) amplifying the received audio signal, and a reproducing circuit (not shown) reproducing the amplified signal into a predetermined electric signal representing a sound wave are mounted in the hands-free apparatus main body 10.

Further, a button set 11 including a power/communication button, a volume-up button, and a volume-down button is provided in the front of the hands-free apparatus main body 10 so as to be able to be elastically pushed.

To this end, as shown in FIG. 12, the button set 11 is configured so that each button is adapted to be separable, is housed in a receptacle of the hands-free apparatus main body 10 on one side thereof, and is inserted into a button port formed in the bottom of the receptacle. Each button has enough size to easily operate with a finger without a sight, and is disposed in the front of the hands-free apparatus main body 10.

Furthermore, an edge of the front of the hands-free apparatus main body 10 is formed with an opening 10a so as to be spatially connected with the receptacle. Thus, the opening 10a allows the volume-down button of the button set 11 to be separated by raising an extending part 11a of the volume-down button using a finger, and to be replaced along with the other buttons.

Further, the hands-free apparatus main body 10 is provided with a charge port 12 on one side thereof which is used to charge the hands-free apparatus in a universal serial bus (USB) interface mode, and may additionally include a plurality of loop holes 13 into which a cord is inserted for carrying or storage so as to be able to be connected to a mobile phone or a bag or to be worn around the neck.

Also, the earphone 20 is mounted on or demounted from the hands-free apparatus main body 10, and is configured to amplify and reproduce the audio signal received from the hands-free apparatus main body 10.

The earphone 20 has a speaker (not shown) mounted therein to amplify and output the audio signal received through the communication module. The earphone 20 is provided with an inserting part 21 on one side thereof which encloses the speaker and protrudes to be inserted into the ear of a user, and a microphone (not shown) receiving voice of the user at a portion thereof which is nearest a mouth of the user.

Further, the earphone 20 further includes a connection plug 23 that is connected with a port part 14 on a lower side of the front of the hands-free apparatus main body 10 in order to amplify the audio signal of the hands-free apparatus main body 10 to output it to the speaker mounted in the earphone 20.

This connection plug 23 is connected with the hands-free apparatus main body 10 by extendable wiring 24 so as to be able to maintain a proper distance from the hands-free apparatus main body 10.

Moreover, the earphone 20 is further provided therein with the take-up unit pulling the wiring 20 so as to wind the wiring 20, and the stop unit controlling a tensile force caused by the take-up unit. The wiring 24, the take-up unit, and the stop unit are housed in a cover part 25 formed on the opposite side of the inserting part 21.

Further, the fastening means 30 is a cord type, and passes through at least one of the loop holes 13 to be connected with the hands-free apparatus main body 10.

Figure 14A:
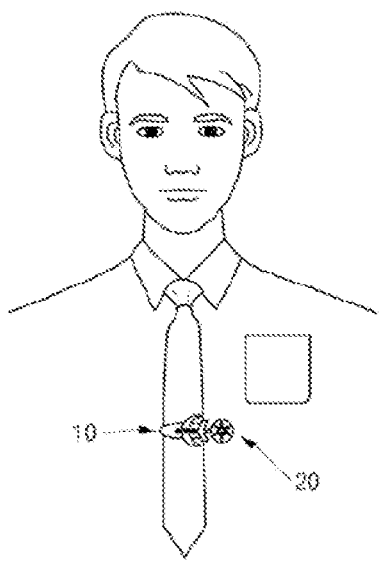
FIGS. 14A and 14B show before and after the hands-free apparatus according to a modification of fastening means of the present invention is used.
Figure 15A:
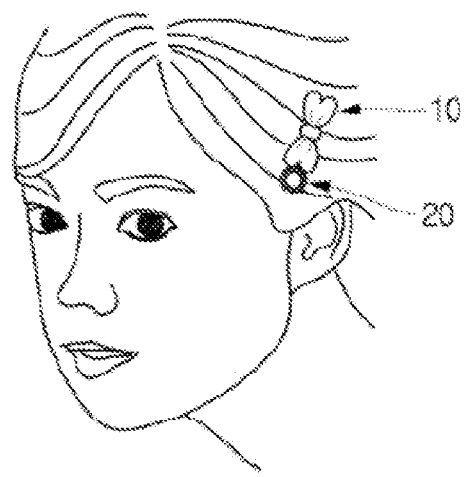
FIGS. 15A and 15B show before and after the hands-free apparatus according to another modification of fastening means and decorating means of the present invention is used.

However, the fastening means 30 is not limited to the cord type. Thus, as shown in FIGS. 14A and 15A, the fastening means 30 may be replaced by a clip type, a pin type, or the like according to the purpose, so that it can be applied as a variety of fashion accessories such as a tiepin, a brooch, a hair pin, and so on.

Meanwhile, the decorating means 40 replaces the button set 11 of the hands-free apparatus main body 10, and is detachably installed on the cover part 25 of the earphone 20.

As shown in FIG. 12, the decorating means 40 is made up of a button accessory 41 which is housed in the receptacle of the front of the hands-free apparatus main body 10 from which the button set 11 is separated, and an earphone cover accessory 42 that is mounted on or demounted from the cover part 25 of the earphone 20. The button accessory 41 includes buttons whose free ends (to be described below) are inserted into the respective button ports formed in the bottom of the receptacle.

Here, the button accessory 41 is configured so that the power/communication button, the volume-up button, and the volume-down button are installed on an integrated body of an accessory model so as to be able to be elastically pushed. Of course, the integrated body may be excluded, and the buttons may be fitted into the respective button ports.

Alternatively, the button accessory 41 may be deformed in such a way that it is placed on the button set 11 without separating the button set 11 so that the power/communication button, the volume-up button, and the volume-down button are operated corresponding to those of the button set.

Further, the earphone cover accessory 42 has a size and shape capable of holding the cover part 25 of the earphone 20, and is partly cut out corresponding to the connection plug 23. The earphone cover accessory 42 may be provided with a press-fitting ridge (not shown) on an inner wall thereof so that the cover part 25 of the earphone 20 can be firmly fixed without coming out in an inserted state.

The earphone cover accessory 42 may be deformed into various structures capable of being mounted on or demounted from the earphone 20. The earphone cover accessory 42 has a floral pattern, a figure of a geometrical pattern, or a letter engraved in intaglio or relief on a front surface thereof. Thus, the earphone 20 can be applied as various fashion accessories.

Figure 13:
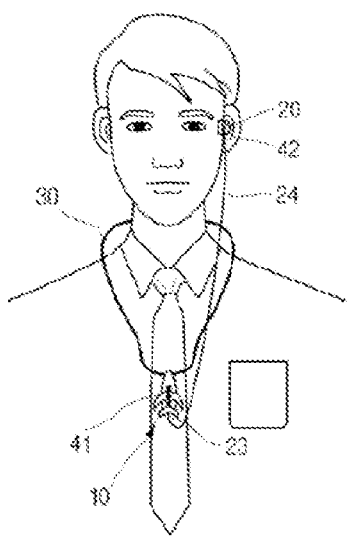
FIG. 13 shows a state of use of FIG. 12.
Figure 14B:
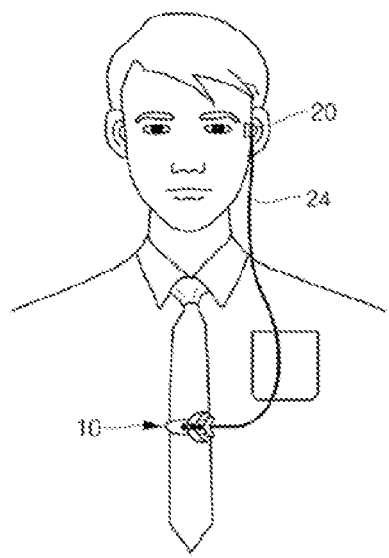
Figure 15B:
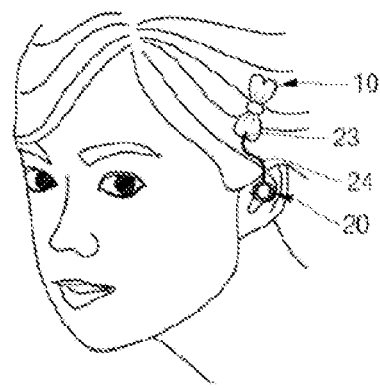

According to the aforementioned hands-free apparatus of the present invention, as shown in FIGS. 13, 14B and 15B, when in use, the hands-free apparatus main body 10 is worn on one of various regions of a human body or a portable object, and the earphone is lengthened by a desired length.

Thus, the present invention has an advantage capable of adequately harmonizing the hands-free apparatus with the human body and the dress through the decorating means 40.

Figure 16:
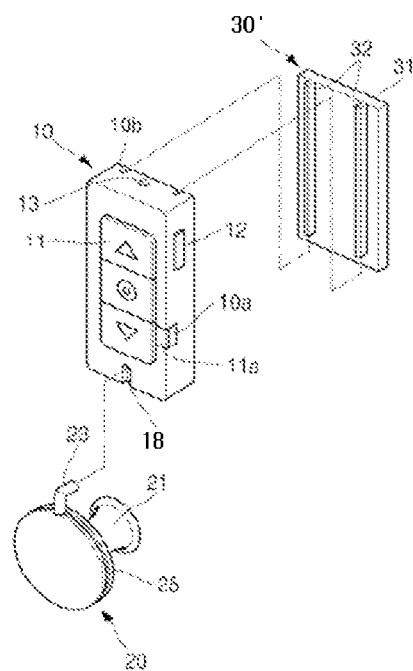
FIG. 16 is an exploded perspective view showing a coupling structure of a hands-free apparatus according to one embodiment of the present invention.
Figure 17:
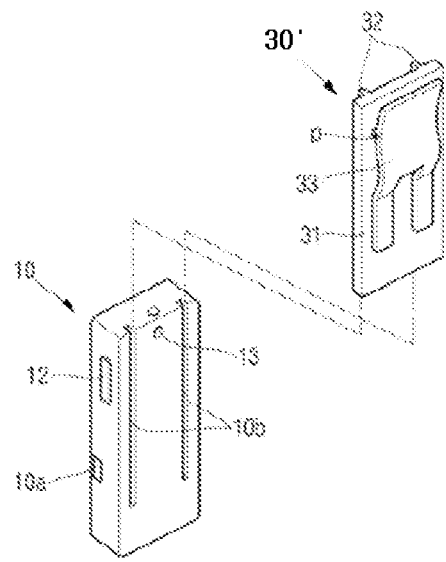
FIG. 17 is a perspective view showing a rear coupling structure of main parts (a hands-free apparatus main body and fastening means) of FIG. 16.
Figure 18:
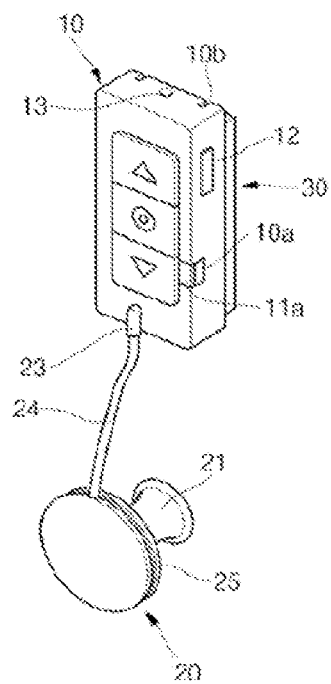
FIG. 18 is a perspective view showing a coupled state of FIG. 1.

FIG. 16 is an exploded perspective view showing a coupling structure of a hands-free apparatus according to an embodiment of the present invention, and FIG. 17 is a perspective view showing a rear coupling structure of main parts (a hands-free apparatus main body and fastening means) of FIG. 16. FIG. 18 is a perspective view showing a coupled state of FIG. 16.

As shown in FIG. 16, the hands-free apparatus according to an embodiment of the present invention includes a hands-free apparatus main body 10, an earphone 20 mounted on or demounted from one side, i.e. a front surface, of the hands-free apparatus main body 10 and amplifying and reproducing an audio signal received from the hands-free apparatus main body 10, and fastening means 30' mounted on or demounted from the other side, i.e. a rear surface, of the hands-free apparatus main body 10.

Here, a communication module receiving an audio signal transmitted from an electronic instrument such as an MPEG-1 or MPEG-2 Audio Layer III (MP3) player or a mobile phone by wire or wireless, an amplifying circuit amplifying the received audio signal, and a reproducing circuit reproducing the amplified signal into a predetermined electric signal representing a sound wave are mounted in the hands-free apparatus main body 10.

Further, a button set 11 including a power/communication button, a volume-up button, and a volume-down button is provided one side, i.e. the front surface, of the hands-free apparatus main body 10 so as to be able to be elastically pushed.

To this end, as shown in FIG. 18, the button set 11 is configured so that each button is adapted to be separable, is housed in a receptacle (not shown) of the hands-free apparatus main body 10 on one side thereof, and is inserted into a button port (not shown) formed in the bottom of the receptacle.

Furthermore, an edge of the front surface of the hands-free apparatus main body 10 is formed with an opening 10a so as to be spatially connected with the receptacle. Thus, the opening 10a allows the volume-down button of the button set 11 to be separated by raising an extending part 11a of the volume-down button using a finger, and to be replaced along with the other buttons.

Further, the hands-free apparatus main body 10 is provided with a charge port 12 on one side thereof which is used to charge the hands-free apparatus in a universal serial bus (USB) interface mode, and may additionally include a plurality of loop holes 13 into which a cord is inserted for carrying or storage so as to be able to be connected to a mobile phone or a bag or to be worn around the neck.

Further, the rear surface of the hands-free apparatus main body 10 is provided with a pair of rail grooves 10b, which are slidably mounted or demounted corresponding to rails 32 of the fastening means 30' to be described below, at the same interval.

However, each rail groove 10b is formed in a lengthwise direction of the hands-free apparatus main body 10, and is formed to be open at one end thereof and to be closed at the other end thereof.

Meanwhile, the earphone 20 has a speaker (not shown) mounted therein to amplify and output the audio signal received through the communication module. The earphone 20 is provided with an inserting part 21 on one side thereof which encloses the speaker and protrudes to be inserted into the ear of a user, and a microphone (not shown) receiving the voice of a user at a portion thereof which is nearest a mouth of the user.

Further, the earphone 20 further includes a connection plug 23 that is connected with a port part 14 at a lower portion of one side, i.e. the front surface, of the hands-free apparatus main body 10 in order to amplify the audio signal of the hands-free apparatus main body 10 to output it to the speaker mounted in the earphone 20.

This connection plug 23 is connected with the hands-free apparatus main body 10 by extendable wiring 24 so as to be able to maintain a proper distance from the hands-free apparatus main body 10.

Moreover, the earphone 20 is further provided therein with a take-up unit (not shown) pulling the wiring 20 so as to wind the wiring 20, and a stop unit (not shown) controlling a tensile force caused by the take-up unit. The wiring 24, the take-up unit, and the stop unit are housed in a cover part 25 formed on the opposite side of the inserting part 21.

Meanwhile, as shown in FIG. 17, the fastening means 30' includes a support plate 31 that is disposed so as to correspond to the other side, the rear surface, of the hands-free apparatus main body 10, the rails 32 that protrude from one side of the support plate 31 at the same interval and are slidably inserted into the pair of rail grooves 10b formed on the other side, the rear surface, of the hands-free apparatus main body 10, and a support part that is installed on the other side of the support plate 31 and mounted on or demounted from one of various positions of a human body or a portable object.

Here, lower ends of the rails 32 of the fastening means 30' is press-fitted into the pair of rail grooves 10b in a lengthwise direction, the fastening means 30' is firmly mounted on the hands-free apparatus main body 10 in parallel as shown in FIG. 18.

The rail grooves 10b and the rails 32 described in this embodiment have cross sections corresponding to each other and an elongate shape. However, the rail grooves 10b and the rails 32 are not limited to this structure. As long as the support plate 31 can be mounted on or demounted from the other side of the hands-free apparatus main body 10, any coupling structure may be used.

As one example, the rail grooves 10b may be formed in a cylindrical shape, and the rails 32 may also be formed in a cylindrical shape so as to be press-fitted into the rail grooves.

As another example, the other side, i.e. the rear surface, of the hands-free apparatus main body 10, and one side of the support plate 31 which corresponds thereto may be provided with Velcro fiber strips (not shown) so as to be able to be mounted or demounted.

Further, the support part of the fastening means 30 according to this embodiment illustrates a clip 33, which is supported on a rotational shaft P installed on the other side of the support plate 31 on one side thereof and is elastically brought into contact with the other side of the support plate 31, by an example.

The clip 33 is restrained by a coil spring (not shown), which encloses a circumferential surface of the rotational shaft P and whose opposite ends are supported on the other side of the support plate 31 and one side of the clip 33, and thus one end thereof is always maintained in an elastic contact with the other side of the support plate 31.

The clip 33 used in the fastening means 30' of this embodiment is a member pressing and supporting opposite surfaces of a thing such as a necktie, a pocket, or the like, and may be replaced by a pin type. In this case, the clip may directly pass through a target thing to support the hands-free apparatus main body 10.

In addition to this, the clip 33 may be replaced by a flexible ring band capable of being worn on an arm.

In this way, the fastening means 30' is replaced by the clip type, the pin type, or the flexible band type according to the purpose, and is applied as various fashion accessories such as a tiepin, brooch, a hair pin, or the like.

Figure 19A:
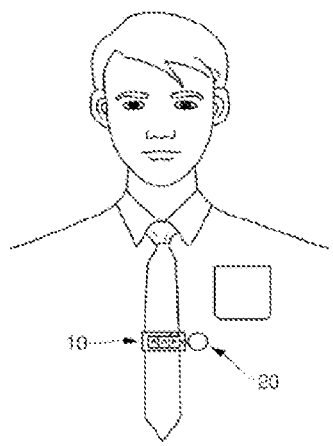
FIGS. 19A and 19B show before and after the hands-free apparatus of FIG. 1 is used.
Figure 19B:
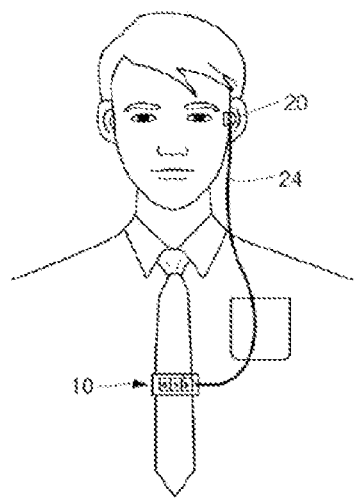
Figure 20A:
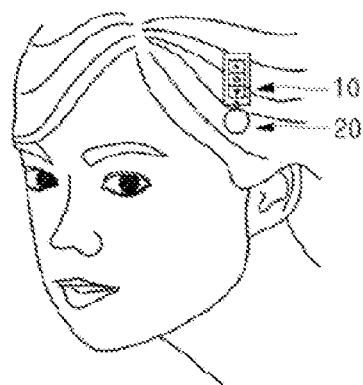
FIGS. 20A and 20B show before and after a hands-free apparatus according to another embodiment of the present invention is used.
Figure 20B:
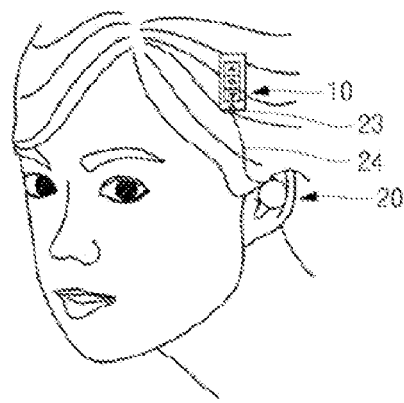

According to the hands-free apparatus as described above, in a state in which the hands-free apparatus main body 10 is worn at one of various positions of the human body (hair, arm, etc.) or the portable object (clothes, necktie, bag, etc.) in an accessory type (see FIGS. 19A and 20A), the cover part 25 of the earphone 20 is pulled by a desired length, and the inserting part 21 of the earphone 20 is inserted into the ear of a user when in use (see FIGS. 19B and 20B).

Thus, a variety of fastening means can be selectively replaced and used. Thereby, the inconvenience that the hands-free apparatus main body 10 should be worn around the neck or be separately carried when not in use is removed, so that the activity and convenience of the user can be improved.

Here, the hands-free apparatus according to the present invention has been described as the mono type in which the speaker of the single earphone is adapted to be inserted into one ear only. The present invention is not limited to the embodiment of the mono type only. Thus, the hands-free apparatus may be applied to the stereo type in which two earphones are adapted to be inserted into opposite ears.

Furthermore, the foregoing is illustrative of the type in which the earphone is coupled to the hands-free apparatus main body. However, the earphone may be implemented as a type in which it is coupled to another portable electronic instrument, for instance a mobile communication terminal, a music playback device, a moving picture playback device, or a personal computer. In this case, another portable electronic instrument may has the holding recess part and the integrated and separable port parts, and the earphone is configured to be selectively coupled with the integrated and separable port parts and to be inserted into the holding recess part in a first state.

Although an exemplary embodiment of the present invention has been described for illustrative purposes, those skilled in the art will appreciate that various modifications, additions and substitutions are possible, without departing from the scope and the spirit of the invention as disclosed in the accompanying claims.

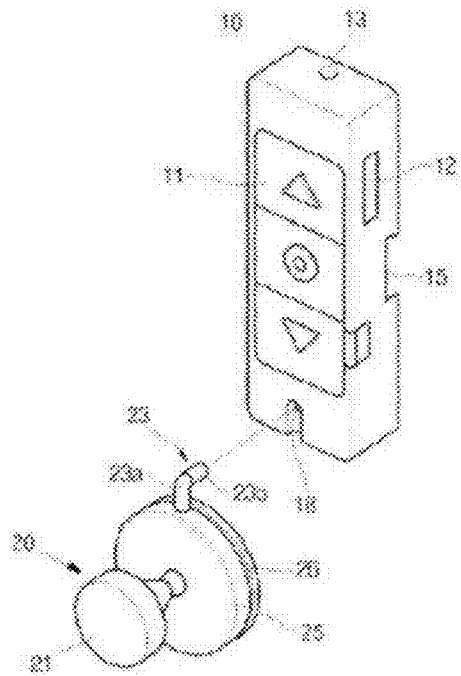

What is claimed is:

1. A hands-free apparatus comprising:
   a hands-free apparatus main body having a holding recess part and integrated and separable port parts; and
   an earphone that is electrically connected with the integrated port part with being inserted into the holding recess part in a first state and is configured to be able to adjust a length of wiring relative to the hands-free apparatus main body in electrical connection with the separable port part in a second state.

2. The hands-free apparatus according to claim 1, wherein the hands-free apparatus main body includes a communication module receiving an audio signal by wire and/or wireless, an amplifying circuit amplifying the received audio signal, and a reproducing circuit reproducing the amplified signal into a predetermined electric signal representing a sound wave, and the reproducing circuit is configured to be selectively connected with the earphone through the integrated or separable port part.

3. The hands-free apparatus according to claim 1, wherein the holding recess part includes a fixing part on a defined surface thereof which fixes a cover part of the earphone to the holding recess part.

4. The hands-free apparatus according to claim 3, wherein the fixing part is a first element formed on the hands-free apparatus main body, and the counterpart fixing part is a second element generating a coupling force in interaction with the first element.

5. The hands-free apparatus according to claim 4, wherein the first element is a ridge part, and second element is a groove part.

6. The hands-free apparatus according to claim 1, wherein the holding recess part includes openings through which the inserted earphone is exposed outside.

7. The hands-free apparatus according to claim 1, wherein the integrated port part is formed in communication with the holding recess part.

8. The hands-free apparatus according to claim 1, wherein the integrated and separable port parts are formed in opposite surfaces of the hands-free apparatus main body, respectively.

9. A hands-free apparatus comprising:
   a hands-free apparatus main body in which a communication module and a circuit are mounted; and
   an earphone that is mounted on or demounted from the hands-free apparatus main body via a connection plug and reproduces an audio signal received through the communication module,
   wherein the earphone includes an automatic take-up unit mounted therein so as to cause wiring to be wound and held by force accumulated when the wiring is pulled out.

10. The hands-free apparatus according to claim 9, wherein the automatic take-up unit includes:
    a fixing shaft fixed to a main body of the earphone; and
    a first elastic member fixed to the fixing shaft at one end thereof and to the wiring at the other end thereof.

11. The hands-free apparatus according to claim 10, wherein the automatic take-up unit further includes a drum around which the wiring and the first elastic member are wound.

12. The hands-free apparatus according to claim 10, wherein the first elastic member is a spiral elastic spring.

13. The hands-free apparatus according to claim 9, wherein the earphone further includes a stop unit configured to maintain a drawn state of the wiring with respect to the hands-free apparatus main body.

14. The hands-free apparatus according to claim 13, wherein the stop unit includes:
    an operational knob whose central portion is rotatably fixed through a hinge shaft;
    a protrusion piece protruding from one side of the operation knob to selectively restrict the wiring; and
    a second elastic member elastically pressing the protrusion piece against the wiring.

15. The hands-free apparatus according to claim 9, wherein the connection plug of the earphone includes:
    a support part supported on a main body of the earphone; and
    a rotating part pivotable around a rotating shaft relative to the support part.

16. The hands-free apparatus according to claim 15, wherein the rotating shaft further includes a rotating unit that allows the rotating part to be rotated and stopped at a plurality of positions with respect to the support part.

17. The hands-free apparatus according to claim 16, wherein the rotating unit includes:
- a stopper formed on a circumferential surface of the rotating shaft installed on the support part of the connection plug, and maintaining a position of the rotating part in a stopped state;
- an elastic member placed on an inner wall of the stopper, and applies an elastic force to the rotating part; and
- a hinge guide setting a rotating position to the stopper, and rotating around the rotating shaft of the support part along with the rotating part.

* * * * *

UNITED STATES PATENT AND TRADEMARK OFFICE
CERTIFICATE OF CORRECTION

PATENT NO. : 9,538,275 B2
APPLICATION NO. : 13/662502
DATED : January 3, 2017
INVENTOR(S) : Youngok Lee It is certified that error appears in the above-identified patent and that said Letters Patent is hereby corrected as shown below:

On the Title Page

Please replace Title Page with attached Title Page with revised number of claims.

In the Claims

Please add Claim 18 as follows:
18. The hands-free apparatus according to claim 17, wherein the hinge guide has a polygonal shape in which a plane enclosed with at least three straight lines is included.

Signed and Sealed this
Twenty-ninth Day of May, 2018

Andrei Iancu
*Director of the United States Patent and Trademark Office*

(12) United States Patent
Lee

(10) Patent No.: US 9,538,275 B2
(45) Date of Patent: Jan. 3, 2017

(54) HANDS-FREE APPARATUS

(71) Applicant: Youngok Lee, Gainesville, FL (US)

(72) Inventor: Youngok Lee, Gainesville, FL (US)

(73) Assignee: Youngok Lee, Gainesville, FL (US)

(*) Notice: Subject to any disclaimer, the term of this patent is extended or adjusted under 35 U.S.C. 154(b) by 1056 days.

(21) Appl. No.: 13/662,502

(22) Filed: Oct. 28, 2012

(65) Prior Publication Data

US 2013/0108069 A1   May 2, 2013

Related U.S. Application Data

(60) Provisional application No. 61/552,441, filed on Oct. 27, 2011.

(51) Int. Cl.
  *H04R 25/00* (2006.01)
  *H04R 1/10* (2006.01)

(52) U.S. Cl.
  CPC .......... *H04R 1/1033* (2013.01); *H04R 2499/11* (2013.01)

(58) Field of Classification Search
  USPC .................................. 381/370, 374, 379
  See application file for complete search history.

(56) References Cited

U.S. PATENT DOCUMENTS 7,680,267 B2 *  3/2010  Bradford ............. H04R 1/1058
                                              379/430
8,204,549 B2 *  6/2012  Kim ...................... H04M 1/0258
                                              381/370

* cited by examiner

*Primary Examiner* — Amir Etesam
(74) *Attorney, Agent, or Firm* — I P & T Group LLP

(57) ABSTRACT

A hands-free apparatus includes a hands-free apparatus main body having a holding recess part and integrated and separable port parts, and an earphone that is electrically connected with the integrated port part with being inserted into the holding recess part in a first state and is configured to be able to adjust a length of wiring relative to the hands-free apparatus main body in electrical connection with the separable port part in a second state.

18 Claims, 12 Drawing Sheets